(12) United States Patent
Wong

(10) Patent No.: US 7,869,795 B2
(45) Date of Patent: Jan. 11, 2011

(54) SYSTEM AND METHOD FOR INFORMING A USER OF THE ARRIVAL OF AN EMAIL AT AN EMAIL SERVER VIA MOBILE PHONE

(76) Inventor: Kamfu Wong, Golden Villa, 3, Keng Hau Rd., Shatin, Hong Kong, Special Administrative Region (CN)

( * ) Notice: Subject to any disclaimer, the term of this patent is extended or adjusted under 35 U.S.C. 154(b) by 917 days.

(21) Appl. No.: 11/658,435

(22) PCT Filed: Apr. 26, 2006

(86) PCT No.: PCT/CN2006/000808
§ 371 (c)(1),
(2), (4) Date: Jan. 26, 2007

(87) PCT Pub. No.: WO2007/121615
PCT Pub. Date: Nov. 1, 2007

(65) Prior Publication Data
US 2008/0318553 A1    Dec. 25, 2008

(30) Foreign Application Priority Data
Mar. 20, 2006   (CN) ........................ 2006 1 0034300

(51) Int. Cl.
H04M 1/725  (2006.01)
H04M 1/663  (2006.01)
H04M 3/42   (2006.01)
H04M 1/00   (2006.01)
H04W 68/00  (2009.01)
H04B 1/38   (2006.01)

(52) U.S. Cl. .............. 455/412.2; 455/412.1; 455/414.1; 455/415; 455/458; 455/567

(58) Field of Classification Search .............. 455/412.1, 455/412.2, 414.1, 567, 415, 458, 466
See application file for complete search history.

(56) References Cited

U.S. PATENT DOCUMENTS
5,351,235 A * 9/1994 Lahtinen ..................... 370/259
(Continued)

FOREIGN PATENT DOCUMENTS
CN          1344094          4/2002
(Continued)

OTHER PUBLICATIONS

Vicomsoft Email Server FAQ—Part One (http://www.vicomsoft.com/knowledge/pdfs/email_qa.pdf), pp. 1-4 provided.*

(Continued)

*Primary Examiner*—Nghi H Ly
*Assistant Examiner*—Larry Sternbane
(74) *Attorney, Agent, or Firm*—Calfee, Halter & Griswold LLP

(57) ABSTRACT

A system and method informs a user of the arrival of an Email at an email server via a phone. The system and method may store a table wherein an Email address for a user is associated with a mobile phone number for the user. The system and method may look up the mobile phone number for the user, as an intended recipient of a new Email, in the table when the new Email arrives at the server. The system and method may then dial the mobile phone number for the user and hang up within a predetermined period of time after getting through. The user is informed that the new Email has arrived at the server by recognizing that the incoming call is from the server.

7 Claims, 4 Drawing Sheets

U.S. PATENT DOCUMENTS

| | | | | |
|---|---|---|---|---|
| 5,546,448 | A * | 8/1996 | Caswell et al. | 379/142.05 |
| 6,118,856 | A * | 9/2000 | Paarsmarkt et al. | 379/93.24 |
| 6,862,342 | B1 * | 3/2005 | Hua et al. | 379/88.13 |
| 6,965,666 | B1 * | 11/2005 | Zhang | 379/88.17 |
| 7,289,792 | B1 * | 10/2007 | Turunen | 455/414.1 |
| 7,299,032 | B2 * | 11/2007 | Yamada et al. | 455/412.1 |
| 7,313,385 | B2 * | 12/2007 | Yabe et al. | 715/752 |
| 2001/0024965 | A1 * | 9/2001 | Hayashi | 455/567 |
| 2001/0029175 | A1 * | 10/2001 | Sellen et al. | 455/412 |
| 2001/0034225 | A1 * | 10/2001 | Gupte et al. | 455/412 |
| 2001/0055963 | A1 * | 12/2001 | Cloutier | 455/417 |
| 2002/0107041 | A1 * | 8/2002 | Mori | 455/527 |
| 2002/0132612 | A1 * | 9/2002 | Ishii | 455/414 |
| 2003/0143983 | A1 * | 7/2003 | Crampton | 455/414 |
| 2003/0194990 | A1 * | 10/2003 | Helferich | 455/412.2 |
| 2003/0211844 | A1 * | 11/2003 | Omori | 455/414.2 |
| 2004/0014456 | A1 * | 1/2004 | Vnnen | 455/413 |
| 2007/0287426 | A1 * | 12/2007 | Link et al. | 455/412.1 |
| 2009/0253444 | A1 * | 10/2009 | Tian et al. | 455/466 |

FOREIGN PATENT DOCUMENTS

| | | |
|---|---|---|
| CN | 1344094 A * | 4/2002 |
| CN | 1457212 | 11/2003 |
| CN | 1578357 | 2/2005 |
| JP | 2001309072 | 11/2001 |
| KR | 20020049928 | 6/2002 |

OTHER PUBLICATIONS

International Search Report from PCT/CN2006/000808, mailed Jan. 11, 2007.

* cited by examiner

SYSTEM AND METHOD FOR INFORMING A USER OF THE ARRIVAL OF AN EMAIL AT AN EMAIL SERVER VIA MOBILE PHONE

CROSS REFERENCE TO RELATED APPLICATIONS

The present application is the U.S. national phase entry of PCT/CN2006/000808 with an international filing date of Apr. 26, 2006 which is incorporated by reference in its entirety.

FIELD

The present invention relates to a system and method for receiving an Email (i.e., an electronic mail message) via a mobile phone and, more particularly, to a system and method for immediately notifying a user that an Email has arrived at an Email server.

BACKGROUND

Conventionally, when using a mobile phone to receive/send an Email, a user generally executes an Email receiving/sending program by pressing keys on the mobile phone. The program then inquires of an Email server whether a latest unreceived Email is available by way of a mobile network. Alternatively, the user sets in the program an automatic timing inquiry of the Email server as to whether there is a new Email. Only when an unreceived new Email is found does the program start to download the Email from the Email server. Generally, the user has no idea when the new Email arrives at the Email server until the user initiates the inquiry of the Email server. Even if an automatic inquiry mode is set, when the Email server receives the new Email, the Email receiving/sending program cannot find the new Email until the automatic inquiry occurs. Only then does the program start to download the Email and inform the user of the Email. The time interval from receiving the new Email in the Email server to informing the user by the Email receiving/sending program running in the user's mobile phone may range from several seconds to many minutes or even longer, depending on the automatic inquiry interval set by the user. The user generally sets the automatic inquiry time internal as every several minutes. Consequently, in most cases, the user will not learn about the new Email at the Email server until a delay of several minutes or longer. Therefore, the user is unable to receive and read the new Email immediately after it arrives at the Email server. Though the user can set a very short automatic inquiry interval to shorten the time delay between inquiring of the Email server, every time the Email receiving/sending program in the mobile phone inquiries of the Email server about the Email, the program occupies certain amounts of data flow. Thus, even if there is no new Email, a certain amount of data flow of the mobile network is consumed. Moreover, a short automatic inquiry interval means an increased amount of data flow of the mobile network must be consumed and, as a result, an increased burden is put on the mobile network.

SUMMARY

An exemplary object of the present invention is to provide a system and method for informing a user of the arrival of an Email at an e-mail server via a mobile phone, such that a user is able to know immediately that an Email sent to the user has arrived at an Email server. Accordingly, the mobile phone for the user need only connect to the Email server when there is new Email for the user to read.

In one exemplary embodiment, a system for informing a user of the arrival of an Email at an e-mail server via a mobile phone is provided, wherein the system comprises: an Email processing device including a table wherein an Email address for a user is associated with a mobile phone number for the user; and a call informing device in communication with the Email processing device, wherein the Email processing device is operable to detect if an Email arrives at an Email server, with the user being an intended recipient of the Email; wherein the Email processing device is operable to look up the mobile phone number for the user in the table using the Email address of the intended recipient of the Email; and wherein the call informing device is operable to dial the mobile phone number provided by the Email processing device.

The Email processing device of the exemplary system comprises: an Email monitoring unit for detecting if the Email arrives at the Email server, and outputting Email information if the Email arrives at the Email server; an Email information reading unit for receiving the Email information output by the Email monitoring unit, reading the Email information to determine the Email address of the intended recipient of the Email, and outputting the Email address of the intended recipient; and a user mobile phone number corresponding unit for receiving the Email address of the intended recipient of the Email output by the Email information reading unit, looking up the mobile phone number for the user corresponding to the intended recipient of the Email in the table, and outputting the mobile phone number for the user to the call informing device.

The call informing device of the exemplary system may be or include a MODEM for dialing the mobile phone number for the user.

In another exemplary embodiment, a system for receiving informing a user of the arrival of an Email at an Email server via a mobile phone is provided, wherein the system comprises: an Email processing device including a table wherein an Email address for a user is associated with a mobile phone number for the user; a call informing device in communication with the Email processing device; and an automatic Email receiving device at a mobile phone of the user, wherein the Email processing device is operable to detect if an Email arrives at an Email server, with the user being an intended recipient of the Email; wherein the Email processing device is operable to look up the mobile phone number for the user in the table using the Email address of the intended recipient of the Email, if the Email arrives at the Email server; wherein the call informing device is operable to receive the mobile phone number for the user from the Email processing device and use the mobile phone number to notify the user of the arrival of the Email at the Email server; wherein the automatic Email receiving device is operable to detect an incoming call; and wherein the automatic Email receiving device is operable to access the Email processing device and download the Email sent to the user, if the incoming call is determined to come from the Email processing device.

The Email processing device of the exemplary system comprises: an Email monitoring unit for detecting if the Email arrives at the Email server, and outputting Email information if the Email arrives at the Email server; an Email information reading unit for receiving the Email information output by the Email monitoring unit, reading the Email information to determine the Email address of the intended recipient of the Email and outputting the Email address of the intended recipient; and a user mobile phone number corresponding unit for receiving the Email address of the intended recipient of the Email output by the Email information reading unit, looking up the mobile phone number for the user corresponding to the intended recipient of the Email in the table, and outputting the mobile phone number for the user to the call informing device; and wherein the automatic Email receiving device comprises: an incoming call number judging unit for judging if the incoming call comes from the Email processing device based on a phone number corresponding to the incoming call, and outputting call matching information if the incoming call comes from the Email processing device; a notifying unit for receiving the call matching information output by the incoming call number judging unit, and notifying the user of the arrival of the Email at the Email server; and an automatic downloading unit for receiving the call matching information output by the incoming call number judging unit, and automatically accessing the Email processing device to download the Email sent to the user.

The automatic Email receiving device of the exemplary system comprises: a ringing judging unit in communication with the incoming call number judging unit and the notifying unit, wherein if the incoming call number judging unit fails to detect the phone number corresponding to the incoming call, the ringing judging unit is operable to judge if a ringing time is shorter than a preset value and output ringing information to the notifying unit if the ringing time is shorter than the preset value.

In still another exemplary embodiment, a method for informing a user of the arrival of an Email at an Email server via a mobile phone is provided, wherein the method comprises: associating an Email address for a user with a mobile phone number for the user and storing the Email address and the mobile phone number in a table; detecting if an Email arrives at an Email server; and if the Email arrives at the Email server: using the Email address of the user as an intended recipient of the Email to look up the mobile phone number for the user in the table; and dialing the mobile number for the user and hanging up automatically within a present time.

If the call informing device fails to get through to the mobile phone for the user, the call informing device will repeatedly and automatically redial the mobile phone number for the user every designated time interval until getting through to the mobile phone for the user.

In yet another exemplary embodiment, a method for receiving an Email via a mobile phone is provided, wherein the method comprises: associating an Email address for a user with a mobile phone number for the user and storing the Email address and the mobile phone number in a table; detecting if an Email arrives at an Email server; and if the Email arrives at the Email server: using the Email address of the user as an intended recipient of the Email to look up the mobile phone number for the user in the table; dialing the mobile phone number for the user; and determining if an incoming call to a mobile phone of the user is coming from an Email processing device and, if so, automatically downloading at least a portion of the Email to the mobile phone.

If it cannot be determined if the incoming call to the mobile phone of the user is coming from the Email processing device, the method further comprises judging whether a ringing time of the incoming call is shorter than a preset value, and if so, automatically downloading at least a portion of the Email to the mobile phone.

The method may further comprise notifying the user of the arrival of the Email at the Email server via audible, textual or vibrating information.

The method further comprises downloading only a portion of the Email from the Email server. Thereafter, the user is prompted prior to downloading the full Email from the Email server to the mobile phone. If the user inputs a command to download the full Email (e.g., by pressing a preset key on the mobile phone), the remaining portion of the Email is downloaded from the Email server. Alternatively, the user may be required to input a download command before any portion of the Email is downloaded from the Email server.

In one exemplary embodiment, a system for informing a user of the arrival of an Email at an Email server via a mobile phone is provided, wherein the system comprises: an Email processing device including a table wherein an Email address for a first user is associated with a mobile phone number of the first user, and a user account for the first user wherein an Email address for a second user is associated with a caller ID for the second user; and a call informing device in communication with the Email processing device, wherein the Email processing device is operable to detect if an Email arrives at an Email server, with the first user being an intended recipient of the Email and the second user being a sender of the Email; wherein the Email processing device is operable to look up the mobile phone number for the first user in the table using the Email address of the intended recipient of the Email; wherein the Email processing device is operable to look up the caller ID for the second user in the user account using the Email address of the sender of the Email; and wherein the call informing device is operable to dial the mobile phone number provided by the Email processing device to inform the first user of the arrival of the Email at the Email server along with the caller ID of the second user.

The Email processing device of the exemplary system comprises: an Email monitoring unit for detecting if the Email arrives at the Email server, and outputting Email information if the Email arrives at the Email server; an Email information reading unit for receiving the Email information output by the Email monitoring unit, reading the Email information to determine the Email address of the intended recipient of the Email and the Email address of the sender of the Email, and outputting the Email address of the intended recipient of the Email and the Email address of the sender of the Email; a user mobile phone number corresponding unit for receiving the Email address of the intended recipient of the Email output by the Email information reading unit, looking up the mobile phone number for the first user corresponding to the intended recipient of the Email in the table, and outputting the mobile phone number for the first user to the call informing device; and an outgoing call number corresponding unit for receiving the Email address of the intended recipient of the Email and the Email address of the sender of the Email output by the Email information reading unit, looking up the user account based on the Email address of the intended recipient of the Email, looking up the caller ID corresponding to the sender of the Email in the user account based on the Email address of the sender of the Email, and outputting the caller ID corresponding to the sender of the Email to the call informing device.

In another exemplary embodiment, a system for receiving an Email via a mobile phone is provided, wherein the system comprises: an Email processing device including a table wherein an Email address for a first user is associated with a mobile phone number for the first user, and a user account for the first user wherein an Email address for a second user is associated with a caller ID for the second user; a call informing device in communication with the Email processing device; and an automatic Email receiving device at a mobile phone of the first user, wherein the Email processing device is operable to detect if an Email arrives at an Email server, with the first user being an intended recipient of the Email and the second user being a sender of the Email; wherein the Email processing device is operable to look up the mobile phone number for the first user in the table using the Email address of the intended recipient of the Email; wherein the Email processing device is operable to look up the caller ID for the second user in the user account using the Email address of the sender of the Email; wherein the call informing device is operable to dial the mobile phone number provided by the Email processing device to inform the intended recipient of the arrival of the Email at the Email server along with the caller ID of the sender; wherein the automatic Email receiving device is operable to detect an incoming call; wherein the automatic Email receiving device is operable to look up the sender or the Email address of the sender in a caller ID table based on the caller ID of the sender; wherein the automatic Email receiving device is operable to display the sender or the Email address of the sender on a display of the mobile phone of the first user; wherein the automatic Email receiving device is operable to prompt the first user prior to downloading the Email from the Email server to the mobile phone; and wherein the automatic Email receiving device is operable to download the Email to the mobile phone if the first user presses a preset key on the mobile phone.

The Email processing device of the exemplary system comprises: an Email monitoring unit for detecting if the Email arrives at the Email server, and outputting Email information if the Email arrives at the Email server; an Email information reading unit for receiving the Email information output by the Email monitoring unit, reading the Email information to determine the Email address of the intended recipient of the Email and the Email address of the sender of the Email, and outputting the Email address of the intended recipient of the Email and the Email address of the sender of the Email; a user mobile phone number corresponding unit for receiving the Email address of the intended recipient of the Email output by the Email information reading unit, looking up the mobile phone number for the first user corresponding to the intended recipient of the Email in the table, and outputting the mobile phone number for the first user to the call informing device; an outgoing call number corresponding unit for receiving the Email address of the intended recipient of the Email and the Email address of the sender of the Email output by the Email information reading unit, looking up the user account based on the Email address of the intended recipient of the Email, looking up the caller ID corresponding to the sender of the Email in the user account based on the Email address of the sender of the Email, and outputting the caller ID corresponding to the sender of the Email to the call informing device; an outgoing call number corresponding unit for receiving the Email address of the intended recipient of the Email and the Email address of the sender of the Email output by the Email information reading unit, looking up the user account based on the Email address of the intended recipient of the Email, looking up the caller ID corresponding to the sender of the Email in the user account based on the Email address of the sender of the Email, and outputting the caller ID corresponding to the sender of the Email to the call informing device; and wherein the automatic Email receiving device comprises: a sender corresponding unit for looking up the sender or the Email address of the sender in a caller ID table based on the caller ID of the sender, and outputting sender information on the sender; a notifying unit for receiving the sender information output by the sender corresponding unit, notifying the user of the arrival of the Email at the Email server, and displaying the sender or the Email address of the sender on a display of a mobile phone of the first user; a control unit for receiving a download command from the first user and outputting a control signal for downloading the Email; and an automatic downloading unit for receiving the sender information output by the sender corresponding unit and the control signal output by the control unit, and automatically accessing the Email processing device to download the Email from the server to the mobile phone.

The automatic Email receiving device of the exemplary system further comprises: a ringing judging unit in communication with the call number judging unit and the notifying unit, for judging whether a ringing time of the incoming call is shorter than a preset value and outputting ringing information to the notifying unit if the ringing time is shorter than the preset value.

In still another exemplary embodiment, a method for informing a user of an Email at an Email server via a mobile phone is provided, the method comprising: associating an Email address for a first user with a mobile phone number for the first user and storing the Email address and the mobile phone number in a table; setting up a user account for the first user wherein an Email address for a second user is associated with a caller ID for the second user; detecting if an Email arrives at an Email server; if the Email arrives at the Email server: using the Email address of the first user as an intended recipient of the Email to look up the mobile phone number for the first user in the table; using the Email address of the second user as a sender of the Email to look up the caller ID for the second user in the user account; dialing the mobile phone number for the first user and hanging up automatically within a preset time.

The exemplary method further comprises: if dialing the mobile phone number fails to connect to the mobile phone for the first user, automatically redialing the mobile phone number for the first user every designated interval until connecting to the mobile phone for the first user.

The exemplary method further comprises: dialing the mobile phone number for the first user with a preset caller ID, if the Email address of the sender does not correspond to a caller ID in the user account.

In yet another exemplary embodiment, a method for receiving an Email via a mobile phone is provided, wherein the method comprises: associating an Email address for a first user with a mobile phone number for the first user and storing the Email address and the mobile phone number in a table; setting up a user account for the first user wherein an Email address of a second user is associated with a caller ID for the second user; detecting if an Email arrives at an Email server; if the Email arrives at the Email server: using the Email address of the first user as an intended recipient of the Email to look up the mobile phone number for the first user in the table; using the Email address of the second user as a sender of the Email to look up the caller ID for the second user in the user account; dialing the mobile phone number for the first user with the caller ID corresponding to the second user; judging if an incoming call to a mobile phone of the first user is coming from an Email processing device and, if so, looking up the sender or the Email address for the sender corresponding to the caller ID of the incoming call; displaying the sender or the Email address of the sender on a display of the mobile phone of the first user; prompting the first user prior to downloading the Email from the Email server to the mobile phone; and downloading the Email to the mobile phone if the first user presses a preset key on the mobile phone.

The exemplary method further comprises, if it cannot be determined whether the incoming call is coming from the Email processing device, judging whether a ringing time of the incoming call is shorter than a preset value and outputting ringing information if the ringing time is shorter than the preset value.

In view of the above, exemplary advantages of the various exemplary embodiments include eliminating the need for a mobile phone in standby mode to inquire of an Email server about the arrival of any new Email. Furthermore, only when new Email arrives at the Email server does the Email server immediately inform the mobile phone for the user of the new Email. Accordingly, the data flow amounts for communication between the Email server and the mobile phone are dedicated to the actual sending/receiving of Email. There is no need for a user's mobile phone to periodically inquire about new Email at the Email server, such that data flow is not wasted and a burden placed on the mobile network is reduced. Additionally, the user is generally informed about the new Email within seconds of its arrival at the Email server, which is considerably faster than with conventional inquiry methods.

As another exemplary advantage, since the user of the mobile phone is informed of the sender of the new Email, the user can make a decision on whether or not to download the new Email from the Email server based on the sender. Consequently, the user is able to more readily ignore junk (e.g., spam) Email. As a result, the data flow amounts used while connecting to the mobile network for downloading the Email are further reduced, and the network resources and the costs borne by the user are saved.

BRIEF DESCRIPTION OF THE DRAWINGS

The above aspects and additional aspects, features and advantages will become readily apparent by describing in detail exemplary embodiments thereof with reference to the attached drawings, wherein like reference numerals denote like elements, and.

DETAILED DESCRIPTION

Figure 1:
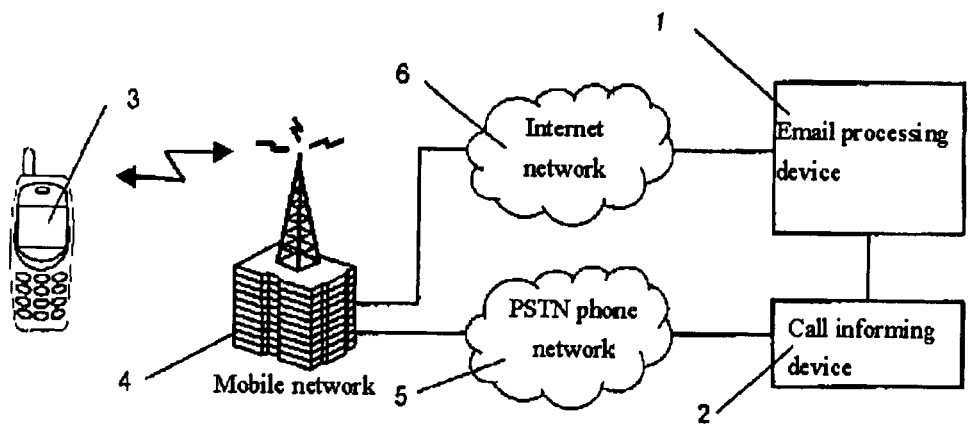
FIG. 1 is a schematic diagram of an exemplary system according to an exemplary embodiment of the present invention.

While the general inventive concept is susceptible of embodiment in many different forms, there are shown in the drawings and will be described herein in detail specific embodiments thereof with the understanding that the present disclosure is to be considered as an exemplification of the principles of the general inventive concept. Accordingly, the general inventive concept is not intended to be limited to the specific embodiments illustrated herein.

As shown in FIG. 1, a system, according to an exemplary embodiment, comprises an Email processing device 1 and a call informing device 2 that are interconnected. As used herein, the term "device" includes hardware, software or both hardware and software. The Email processing device 1 communicates with a user mobile terminal 3 via a network 6 (e.g., the Internet) and a mobile network 4. The call informing device 2 communicates with the user mobile terminal 3 via a phone network 5 (e.g., a PSTN) and the mobile network 4.

The Email processing device 1, including a computer server which runs an Email processing program, deposits and transfers Email for users, and generally uses POP, IMAP, SMTP or some other Email communication protocol to receive/send Email via the Internet. Said Email processing device 1 comprises a dialing up processing program and corresponding circuit interface, as well as a preset table wherein an Email address for a user and a corresponding mobile phone number for the user is stored. The Email processing device 1 detects whether a new Email arrives at the Email processing device 1 and, when a new Email is detected, looks up the mobile phone number for the user corresponding to the Email address of the intended recipient of the new Email in the preset table. The call informing device 2 is operable to dial a phone number. The call informing device 2 receives the mobile phone number for the user from the Email processing device 1 and then dials the mobile phone number. The call informing device 2 automatically hangs up the line after the call to the user's mobile phone is connected. Alternatively, the call informing device 2 may hang up the line within a predetermined time (e.g., one second) after connecting to the mobile phone for the user. The call informing device 2 may use a MODEM to dial the phone number.

The user mobile terminal 3 is a device such as a mobile phone of the user, a PDA or the like, provided with an automatic Email receiving device of an Email user terminal. The automatic Email receiving device may be an Email user terminal program, also called an automatic Email receiving program. The automatic Email receiving device detects the phone number corresponding to an incoming call or a ringing time. In one exemplary embodiment, when the automatic Email receiving device (see FIG. 3) within the user mobile terminal 3 detects that the incoming call comes from the Email processing device 1, the automatic Email receiving device automatically connects to and accesses the Email processing device 1 to download the new Email sent to the user. In another exemplary embodiment, if the ringing time of the incoming call is within the designated time interval (i.e., the line hangs up within a certain time), this is regarded as a notice for a new Email. The automatic Email receiving device can then automatically connect to and access the Email processing device 1 to download the new Email sent to the user. Moreover, the automatic Email receiving device can notify the user of the arrival of the new Email, for example, by voice, text or vibrating information.

The mobile network 4 can be a conventional mobile network, including mobile networks such as GSM, CDMA, 3G and the like, which is connected to the Internet by way of GPRS or some other communication mode and provides an Internet connecting function for the mobile phone user.

The PSTN phone network 5 is a conventional fixed phone network, which provides phone wires for the communication between the call informing device 2 and the user mobile terminal 3, which can also be replaced by the mobile network 4.

The Internet network 6 is a conventional network over which Email is transferred.

Figure 2:
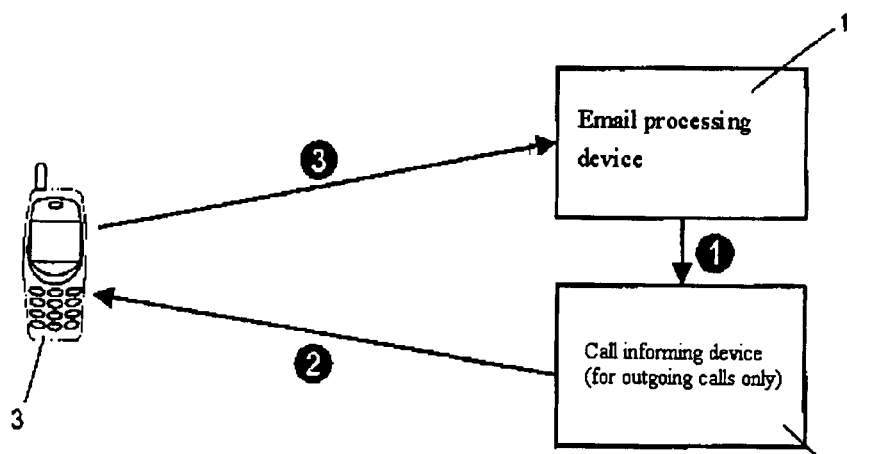
FIG. 2 is a schematic diagram showing exemplary communication paths for the exemplary system of FIG. 1.

FIG. 2 is a flow chart according to an exemplary embodiment. In the flow chart, the lines connecting the individual devices indicate the direction of communication between the devices. The lines are numbered to represent corresponding steps 1-3, as described below. To facilitate illustration of the exemplary embodiment, the mobile network 4, PSTN phone network 5 and the Internet network 6 are not shown in FIG. 2.

In step 1, when the Email processing device 1 receives the new Email sent to the user, the Email processing device 1 looks up the mobile phone number for the user corresponding to the Email address of the intended recipient of the new Email in the preset table, and then transfers the mobile phone number for the user to the call informing device 2.

In step 2, the call informing device 2 immediately dials the mobile phone number for the user and hangs up the line automatically after connecting to the mobile phone of the user. Alternatively, the call informing device 2 may automatically hang up the line within a predetermined time (e.g., within one second) after connecting to the mobile phone for the user.

In step 3, the mobile phone (i.e., the user mobile terminal 3) for the user receives the incoming call from the call informing device 2. The user recognizes from the phone number displayed on the user's mobile phone that the incoming call comes from the Email processing device 1 and, thus, the user knows that there is new Email to be retrieved. Accordingly, the user is able to immediately connect to and access the Email processing device 1 to download the new Email.

In one exemplary embodiment, any mobile phone user, so long as the user adopts a mobile network which provides a caller ID service, can be immediately alerted to the presence of new Email. When the user recognizes from the displayed phone number corresponding to the incoming call that the call is from the Email processing device 1, the user knows there is new Email.

In another exemplary embodiment, if the user does not adopt a mobile network which provides a caller ID service, the user can still be alerted immediately to the presence of new Email. When the user receives an incoming call that hangs up within a predetermined time (e.g., within one second), the user can be reasonably certain that this is a notification from the Email processing device 1 that there is new Email.

Figure 3:
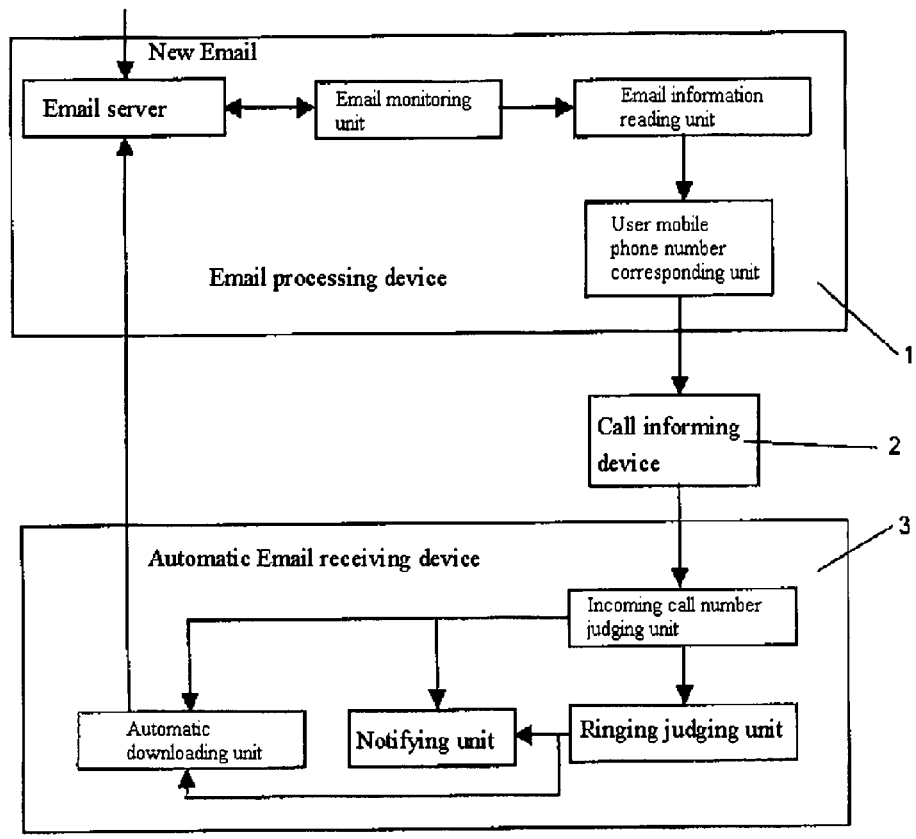
FIG. 3 is a structural diagram showing exemplary components and connections for the exemplary system of FIG. 1.

FIG. 3 is a diagram showing the components and connections of the exemplary system of FIG. 1. The Email processing device 1 comprises an Email server, an Email monitoring unit, an Email information reading unit and a user mobile phone number corresponding unit. The Email monitoring unit detects whether a new Email arrives at the Email server, and outputs information of any new Email. The Email information reading unit receives the information of the new Email output by the Email monitoring unit, and then reads and outputs the Email address of the intended recipient of the new Email. The user mobile phone number corresponding unit receives the Email address for the intended recipient of the new Email output by the Email information reading unit, and then finds out the corresponding mobile phone number for the user stored in the preset table based on the Email address for the intended recipient. The user mobile phone number corresponding unit then outputs the mobile phone number for the user to the call informing device 2. The call informing device 2 dials the user's mobile phone which supports caller ID.

The automatic Email receiving device at the user mobile terminal 3 comprises an incoming call number judging unit, a ringing judging unit, a notifying unit and an automatic downloading unit. The incoming call number judging unit judges from the number corresponding to the incoming call whether the incoming call comes from the Email processing device 1. The incoming call number judging unit outputs information when it determines the incoming call comes from the Email processing unit 1. The incoming call number judging unit outputs a control signal to the ringing judging unit when it fails to detect the phone number corresponding to the incoming call. The ringing judging unit is attached to incoming call number judging unit and the notifying unit. When the incoming call number judging unit fails to detect the phone number corresponding to the incoming call, it judges whether the ringing time is shorter than a preset value, and outputs information to the notifying unit when the ringing time is shorter than the preset value. The notifying unit receives the information output from the incoming call number judging unit or the information output from the ringing judging unit, and notifies the user of the arrival of the new Email. The automatic downloading unit receives the information output from the incoming call number judging unit or the information output from the ringing judging unit, and automatically connects to and accesses the Email processing device 1 to download the new Email sent to the user.

Figure 4:
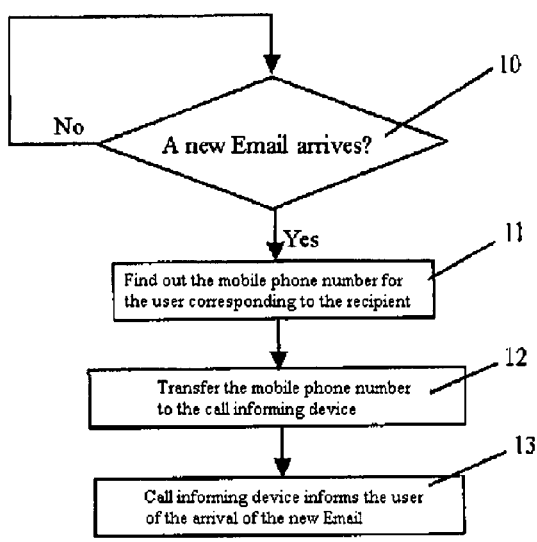
FIG. 4 is a flow chart showing the processing flow in an exemplary server terminal of an exemplary embodiment of the present invention.

FIG. 4 is a flow chart showing processing in an exemplary server terminal (i.e., the Email processing device 1 and the call informing device 2) which comprises steps 10-13, as described below.

In step 10, an Email address for a user is associated with a mobile phone number for the user and stored in the preset table within the Email processing device 1. The Email processing device 1 detects whether a new Email arrives at the Email server and, when the new Email arrives, the processing proceeds to step 11.

In step 11, the Email processing device 1 looks up the mobile phone number for the user corresponding to the intended recipient of the new Email in the preset table, and then the processing proceeds to step 12.

In step 12, the Email processing device 1 transfers the mobile phone number for the user to the call informing device 2, and then the processing proceeds to step 13.

In step 13, the call informing device 2 informs the user of the arrival of the new Email according to the mobile phone number for the user by, for example, by dialing the mobile phone number for the user.

Figure 5:
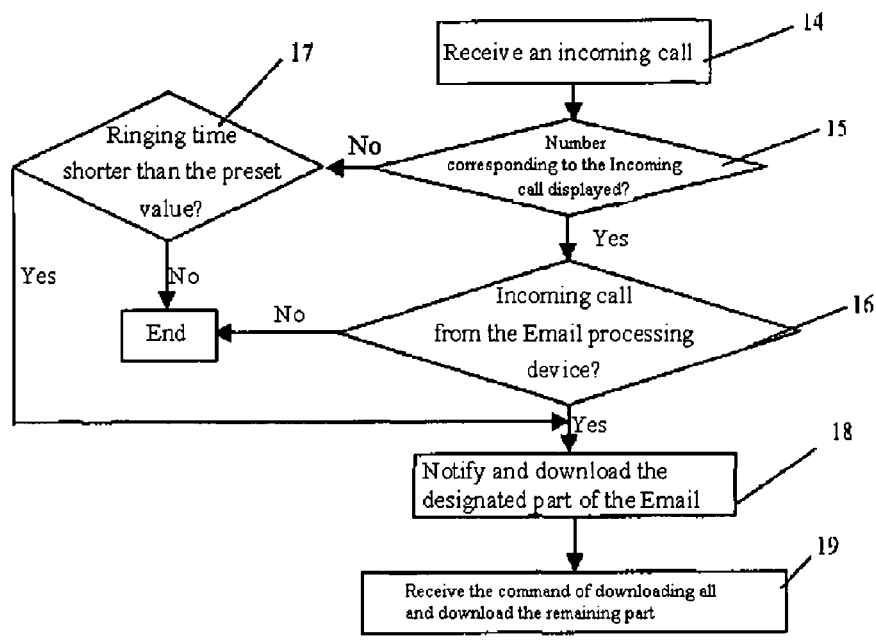
FIG. 5 is a flow chart showing the processing flow in an exemplary user mobile terminal of an exemplary embodiment of the present invention.

FIG. 5 is a flow chart showing processing in an exemplary user mobile terminal 3 which comprises steps 14-19, as described below.

In step 14, the user mobile terminal 3 receives an incoming call and processing proceeds to step 15.

In step 15, the user mobile terminal 3 judges whether a phone number corresponding to the incoming call is displayed (e.g., via caller ID). If the phone number is displayed, the processing continues to step 16. Otherwise, the processing continues to step 17.

In step 16, the automatic Email receiving device uses the phone number of the incoming call to judge whether the incoming call comes from the Email processing device 1. If the incoming call comes from the Email processing device 1, the processing continues to step 18. Otherwise, the processing ends.

In step 17, the automatic Email receiving device judges whether the ringing time of the incoming call is shorter than a preset value. If the ringing time of the incoming call is shorter than the preset value, the processing continues to step 18. Otherwise, the processing ends.

In step 18, the user is notified of the arrival of the new Email. The automatic Email receiving device then automatically connects to and accesses the Email processing device 1 to download the new Email sent to the user. Initially, only a designated amount of data from the front of each Email is downloaded, for example, only the first 2000 bytes of the Email are downloaded. Processing then proceeds to step 19.

In step 19, when reviewing the designated amount of data from the Email, the user can give a command to download the full Email to the automatic Email receiving device by manually pressing a key if the user wants to read the whole Email. The automatic email receiving device again connects to and accesses the Email processing device 1 to download the remaining (i.e., not yet downloaded) portion of the Email. In this case, when the user receives a large Email, the user has the option as to whether to download the full Email to the mobile phone, such that cost and time for data transmission are saved and the burden placed on the mobile network 4 is reduced. The user mobile terminal 3 may adapt GPRS or some other method, such as WiMax, WiFi or Bluetooth to be connect to and access the Email processing device 1, which saves cost for data transmission.

If the user is provided with a caller ID service, the automatic Email receiving device at the user mobile terminal 3 knows whether an incoming call comes from the Email processing device 1 and, if so, that there is a new Email to receive.

If the user is not provided with the caller ID service (e.g., when the mobile phone is roaming or where the automatic Email receiving device at the user mobile terminal 3 fails to determine the phone number corresponding to the incoming call), the automatic Email receiving device is capable of judging whether the call is from the Email processing device 1 by the ringing time length of the incoming call. Generally speaking, when people make phone calls, they seldom hang up without waiting for more than one second. Consequently, it is feasible to judge an incoming call which rings for less than one second as a call from the Email processing device 1. Even if other incoming calls are mistaken as originating from the Email processing device 1, the user mobile terminal 3 will know there is no new Email after connecting to and accessing the Email processing device 1, which does not inconvenience the user. When the mobile phone receives an incoming call without the phone number being shown, and when the ringing time is shorter than the designated value (e.g., one second), the incoming call is likely from the Email processing device 1, which means that there is likely a new Email to receive. The above example is illustrated by taking one second as a designated value for the ringing time. Of course, the general inventive concept is not limited to this value but instead encompasses other values.

Figure 6:
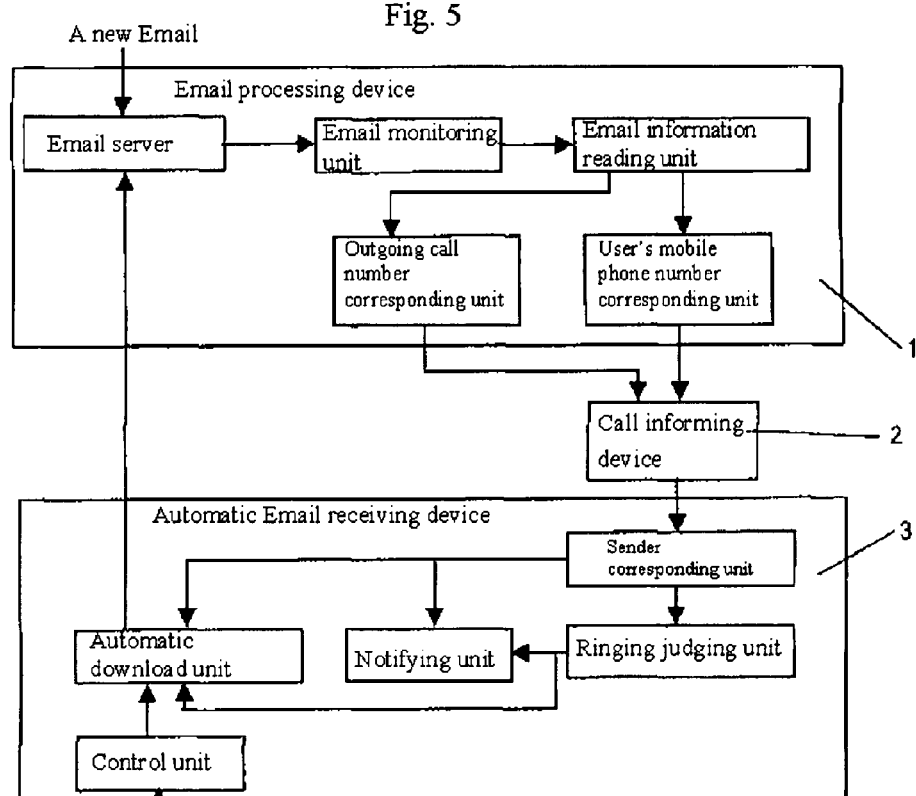
FIG. 6 is a structural diagram of an exemplary system according to another exemplary embodiment of the present invention.

As shown in FIG. 6, according to another exemplary embodiment, the Email processing device 1 comprises an Email server, an Email monitoring unit, an Email information reading unit and a user's mobile phone number corresponding unit and an outgoing call number corresponding unit. The Email monitoring unit detects whether a new Email arrives at the Email server and, if a new Email is detected, outputs information of the new Email. The Email information reading unit receives the new Email information output by the Email monitoring unit, reads and outputs the Email address for an intended recipient of the new Email and the Email address for the sender of the new Email. The user's mobile phone number corresponding unit receives the Email address for the intended recipient of the new Email output by the Email information reading unit, looks up the corresponding mobile phone number for the user in the preset table using the Email address for the intended recipient, and outputs the mobile phone number for the user to the call informing device 2. The outgoing call number corresponding unit receives the Email address for the intended recipient of the new Email and the Email address for the sender of the new Email output by the Email information reading unit. The outgoing call number corresponding unit accesses the account for the user according to the Email address for the intended recipient of the new Email, and then looks up in the account for the user the caller ID corresponding to the sender according to the Email address for the sender of the new Email. The outgoing call number corresponding unit then outputs the caller ID corresponding to the sender to the call informing device 2. The automatic Email receiving device of the user mobile terminal 3 comprises a sender corresponding unit, a notifying unit, a control unit and an automatic downloading unit. The sender corresponding unit determines the sender or the Email address for the sender using the phone number corresponding to the caller ID in the table of "sender—caller ID" set by the user according to the incoming number, and outputs the information about the sender. The notifying unit receives the information about the sender output by the sender corresponding unit, and notifies the user of the arrival of the new Email and displays the sender or the Email address for the sender. The control unit receives the downloading command from the user and outputs the control signal for downloading the new Email. The automatic downloading unit receives the information about the sender output by the sender corresponding unit and the control signal for downloading, and then automatically connects to and accesses the Email processing device to download the new Email sent to the user.

Figure 7:
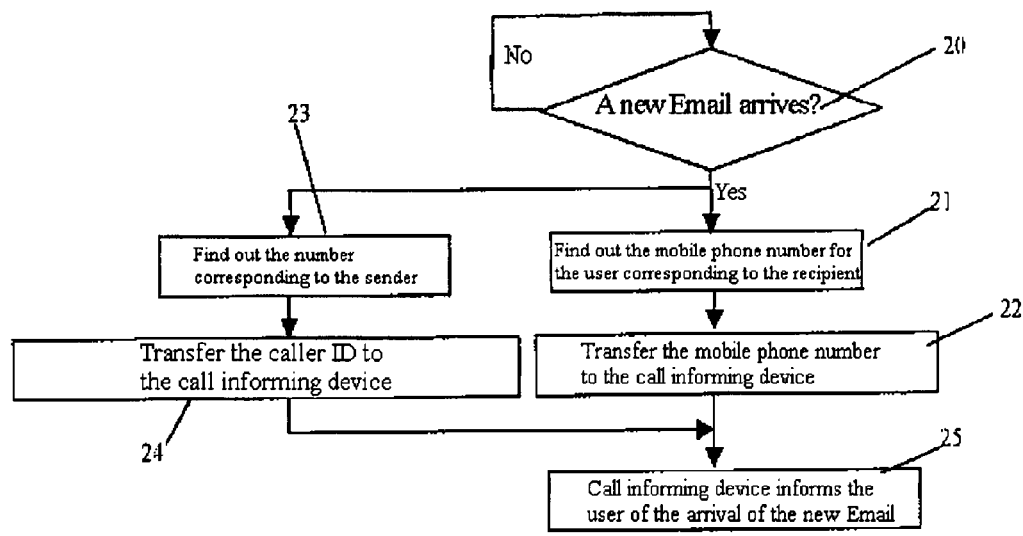
FIG. 7 is a flow chart showing the processing flow of an exemplary server terminal of another exemplary embodiment of the present invention.

The automatic Email receiving device further comprises a ringing judging unit attached to the sender corresponding unit and the notifying unit. The ringing judging unit judges whether a ringing time is shorter than a preset value when the sender corresponding unit fails to detect the phone number corresponding to the incoming call. The ringing judging unit outputs information to the notifying unit to notify the user of the arrival of a new Email when the ringing time is shorter than the preset value FIG. 7 is a flow chart showing processing in an exemplary server terminal (i.e., the Email processing device 1 and the call informing device 2) which comprises steps 20-25, as described below.

In step 20, an Email address for a user is associated with a mobile phone number for the user and stored in the preset table within the Email processing device 1. The Email processing device 1 detects whether a new Email arrives at the Email server and, when the new Email arrives, the processing proceeds to steps 21 and 23.

In step 21, the Email processing device 1 looks up the mobile phone number for the user corresponding to the intended recipient of the new Email in the preset table, and then the processing proceeds to step 22.

In step 22, the Email processing device 1 transfers the mobile phone number for the user to the call informing device 2, and then the processing proceeds to step 25.

In step 23, the Email processing device 1 looks up the caller ID corresponding to the sender in the account for the user using the Email address for the intended recipient of the new Email and the Email address for the sender of the new Email. If the caller ID corresponding to the sender cannot be determined, the sender is associated with a preset caller ID, and then the processing proceeds to step 24.

In step 24, the Email processing device 1 transfers the caller ID corresponding to the sender of the new Email to the call informing device 2, and then the processing proceeds to step 25.

In step 25, the call informing device 2 dials the mobile phone number for the user to inform the user of the arrival of the new Email at the Email server, along with the caller ID corresponding to the sender of the new Email.

Figure 8:
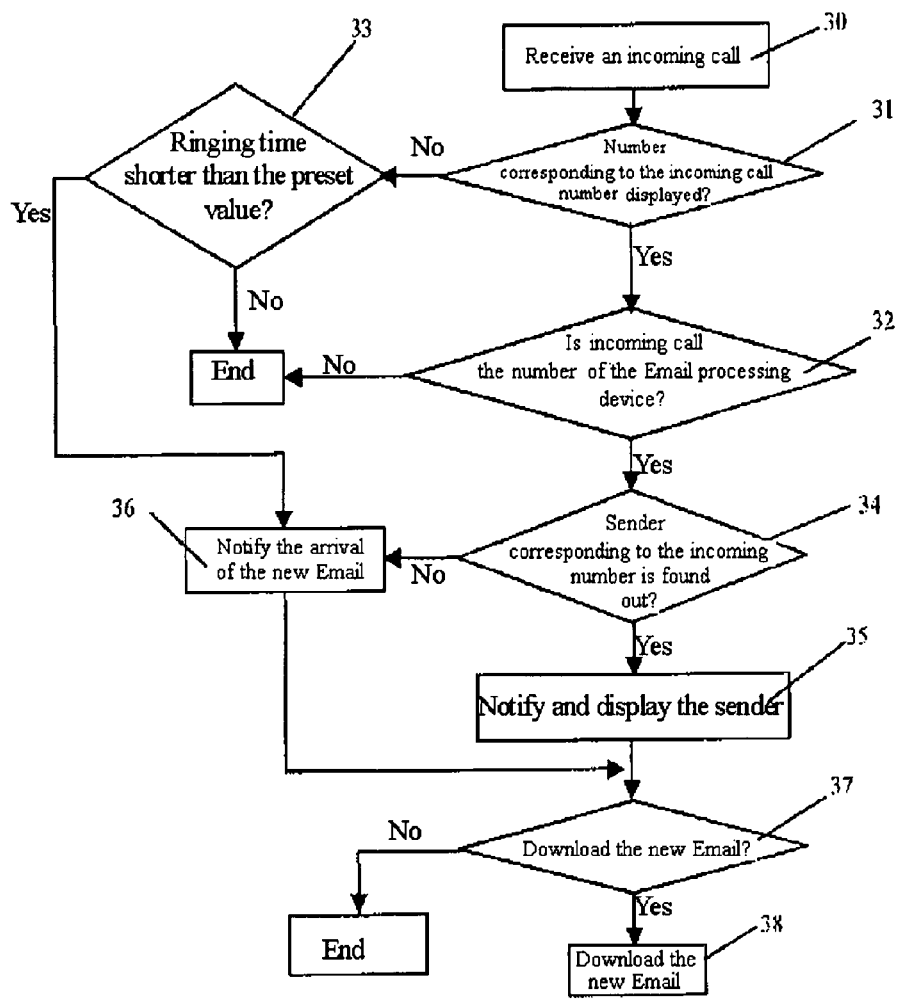
FIG. 8 is a flow chart showing the processing flow of an exemplary user mobile terminal of another exemplary embodiment of the present invention.

FIG. 8 is a flow chart showing processing in an exemplary user mobile terminal 3 which comprises steps 30-38, as described below.

In step 30, the user mobile terminal 3 receives an incoming call, and processing proceeds to step 31.

In step 31, the user mobile terminal 3 judges whether a phone number corresponding to the incoming call is displayed (e.g., via caller ID). If the phone number is displayed, the processing continues to step 32. Otherwise, the processing continues to step 33.

In step 32, the automatic Email receiving device of the user mobile terminal 3 judges whether the incoming call comes from the Email processing device 1. If the incoming call comes from the Email processing device 1, the processing continues to step 34. Otherwise, the processing ends.

In step 33, the automatic Email receiving device of the user mobile terminal 3 judges whether the ringing time of the incoming call is shorter than a preset value. If the ringing time of the incoming call is shorter than the preset value, the processing continues to step 36. Otherwise, the processing ends.

In step 34, using the phone number of the incoming call, the automatic Email receiving device looks up the sender or the Email address for the sender of the new Email corresponding to the phone number in the preset table for the user. If the sender is determined, the processing continues to step 35. Otherwise, the processing continues to step 36.

In step 35, the automatic Email receiving device notifies the user of the arrival of the new Email (e.g., via audible or vibrating information), and displays the sender or the Email address for the sender on the display of the mobile phone. The processing then proceeds to step 37.

In step 36, the automatic Email receiving device notifies the user of the arrival of the new Email (e.g., via audible or vibrating information) without displaying the sender or the Email address for the sender, and then the processing proceeds to step 37.

In step 37, the automatic Email receiving device prompts the user as to whether the new Email should be fully downloaded. If the user chooses to download the new Email, the processing proceeds to step 38, wherein the user mobile terminal 3 automatically connects to and accesses the Email processing device 1 to download the new Email from the Email server. If the user chooses not to download the new Email, the processing ends. The user can decide whether or not to download the new Email based on the sender or the Email address for the sender if such information is displayed.

In an exemplary embodiment, an Email processing device 1 is established, which has its own independent domain name and IP address. In addition, a plurality of (for example, 10 to 1000) fixed phone numbers and phone wires are applied for the caller IDs. The call informing device 2 is linked to the phone wires of the fixed phone numbers. Besides, each user is assigned an Email address which represents a user number in the Email processing device 1. The mobile phone number and the Email address for the user are stored in a user administrative record within the Email processing device 1. At the user mobile terminal 3 (e.g., a mobile phone or PDA), an Email user terminal program (e.g., the exemplary automatic Email receiving device described above) is set up. At the same time, a SIM card corresponding to the registered mobile phone number should be inserted into the user mobile terminal 3.

The user should meanwhile establish an Email communication record (Email record) which contains the names, Email addresses and the caller IDs of contact persons of the user. Each Email address is assigned a designated caller ID according to different persons or groups. These caller IDs are selected from the plurality of fixed phone numbers applied for in advance within the Email processing device 1. The user stores the Email communication record (Email record) containing names, Email addresses and the corresponding caller IDs of contact persons in the account for the user within the Email processing device 1, as well as in the user mobile terminal 3. The structure of an exemplary Email communication record (Email record) is shown in Table 1:

TABLE 1

| Name of contact person | Email Address | Caller ID |
| --- | --- | --- |
| Others | | 34603000 |
| Huang Jinfu | Huangjinfu@123456abc.com | 34603001 |
| Zhou Huifang | lorinda@gmail.com | 34603002 |
| Chen Dawen | xsw@golowindows.com | 34603003 |
| Zhang San | ken@yhaoo.com | 34603004 |
| Li Si | wkf@china.com | 34603005 |
| Gao Jianqiang | winwin@126.com | 34603006 |
| Chen Junxi | fanny@starcyber.com | 34603007 |
| Huang Meimei | hmm@sendxq.com | 34603008 |

When the Email processing device 1 receives new Email sent to the user, the Email processing device 1 looks up the account for the user according to the Email address for the intended recipient of the new Email and determines the mobile phone number for the user corresponding to the intended recipient. From the Email address for the sender of the new Email, the Email processing device 1 looks up in the Email communication record for the user the caller ID corresponding to the Email address set by the user. Then the system (i.e., the call informing device 2) immediately dials the user mobile terminal 3 for the user to inform the user of the arrival of the new Email by the phone wires of the caller IDs set by the user. The call informing device 2 hangs up the line immediately after getting through the line. As used herein, "hanging up the line immediately after getting through the line" means hanging up the line immediately without the user answering the phone after the user mobile terminal 3 rings. Since the user does not answer the phone, in general, no fees are charged.

When the user mobile terminal 3 receives an incoming call from the call informing device 2, the Email user terminal program looks up in the Email communication record (Email record) the corresponding Email address for the sender according to the caller ID and displays text on the display of the user mobile terminal 3, and/or provides a notifying sound to notify the user of the arrival of the new Email. Using the Email user terminal program, the user finds out the Email address for the sender of the new Email based on the caller ID, such that the user is informed of the sender of the new Email. After that, the user can make a decision whether to download and read the Email via the mobile phone or some other device (e.g., a computer). Since the user can selectively download the Email by recognizing different senders via the number corresponding to the incoming call, the user need not immediately download all new Email, such that both time and data flow amounts are saved. For example, if ten Emails are sent to the user, the user may decide that only two are interesting enough for the user to download and read. After the mobile phone receives the incoming call from the call informing device 2, the user knows only two Emails are interesting to read using the Email user terminal program. The user then presses a key to instruct the program to download these two Emails. Since the remaining eight Emails are not downloaded, a savings of approximately 80% of the data flow amounts, as compared with the conventional method for receiving an Email, is realized.

When the Email processing device 1 fails to find out the caller ID corresponding to the sender according to the Email address for the sender in the new Email, the call informing device 2 will dial the user mobile terminal 3 via the phone wire of a preset caller ID (i.e. the caller ID associated with "Others" in the row of Table 1). The user will thus know that the incoming new Email was sent from other persons, and can use this information when deciding on whether or not to download and read the new Email. Generally, most Email from strangers is some form of an advertisement or junk Email, and may even be a virus carrying Email. Hence, most users will not download and read such Email. Since the Email address for the sender of the new Email is recognized via the number corresponding to the incoming call, the user can selectively download the new Email, such that cost and time spent on communication are saved.

The above description of specific embodiments has been given by way of example. From the disclosure given, those skilled in the art will not only understand the general inventive concept and its attendant advantages, but will also find apparent various changes and modifications to the structures and methods disclosed. It is sought, therefore, to cover all such changes and modifications as fall within the spirit and scope of the general inventive concept, as defined herein, and equivalents thereof.

The invention claimed is:

1. A system for informing a user of the arrival of an Email at an Email server via a mobile phone, the system comprising:
    an Email processing device including a table wherein an Email address for a first user is associated with a mobile phone number for the first user, and a user account for the first user wherein an Email address for a second user is associated with a caller ID for the second user; and
    a call informing device in communication with the Email processing device,
    wherein the Email processing device is operable to detect if an Email arrives at an Email server, with the first user being an intended recipient of the Email and the second user being a sender of the Email;
    wherein the Email processing device is operable to look up the mobile phone number for the first user in the table using the Email address of the intended recipient of the Email;
    wherein the Email processing device is operable to look up the caller ID for the second user in the user account using the Email address of the sender of the Email; and
    wherein the call informing device is operable to dial the mobile phone number provided by the Email processing device to inform the first user of the arrival of the Email at the Email server along with the caller ID of the second user.

2. The system according to claim 1, wherein the Email processing device comprises:
    an Email monitoring unit for detecting if the Email arrives at the Email server, and outputting Email information if the Email arrives at the Email server;
    an Email information reading unit for receiving the Email information output by the Email monitoring unit, reading the Email information to determine the Email address of the intended recipient of the Email and the Email address of the sender of the Email, and outputting the address of the intended recipient of the Email and the Email address of the sender of the Email;
    a user mobile phone number corresponding unit for receiving the Email address of the intended recipient of the Email output by the Email information reading unit, looking up the mobile phone number for the first user corresponding to the intended recipient of the Email in the table, and outputting the mobile phone number for the first user to the call informing device; and
    an outgoing call number corresponding unit for receiving the Email address of the intended recipient of the Email and the Email address of the sender of the Email output by the Email information reading unit, looking up the user account based on the Email address of the intended recipient of the Email, looking up the caller ID corresponding to the sender of the Email in the user account based on the Email address of the sender of the Email, and outputting the caller ID corresponding to the sender of the Email to the call informing device.

3. A system for receiving an Email via a mobile phone, the system comprising:
    an Email processing device including a table wherein an Email address for a first user is associated with a mobile phone number for the first user, and a user account for the first user wherein an Email address for a second user is associated with a caller ID for the second user;
    a call informing device in communication with the Email processing device; and
    an automatic Email receiving device at a mobile phone of the first user;
    wherein the Email processing device is operable to detect if an Email arrives at an Email server, with the first user being an intended recipient of the Email and the second user being a sender of the Email;
    wherein the Email processing device is operable to look up the mobile phone number for the first user in the table using the Email address of the intended recipient of the Email;
    wherein the Email processing device is operable to look up the caller ID for the second user in the user account using the Email address of the sender of the Email;
    wherein the call informing device is operable to dial the mobile phone number provided by the Email processing device to inform the intended recipient of the arrival of the Email at the Email server along with the caller ID of the sender;
    wherein the automatic Email receiving device is operable to detect an incoming call;
    wherein the automatic Email receiving device is operable to look up the sender or the Email address of the sender in a caller ID table based on the caller ID of the sender;
    wherein the automatic Email receiving device is operable to display the sender or the Email address of the sender on a display of the mobile phone of the first user;
    wherein the automatic Email receiving device is operable to prompt the first user prior to downloading the Email from the Email server to the mobile phone; and
    wherein the automatic Email receiving device is operable to download the Email to the mobile phone if the first user presses a preset key on the mobile phone.

4. The system according to claim 3, wherein the Email processing device comprises:
    an Email monitoring unit for detecting if the Email arrives at the Email server, and outputting Email information if the Email arrives at the Email server;
    an Email information reading unit for receiving the Email information output by the Email monitoring unit, reading the Email information to determine the Email address of the intended recipient of the Email and the Email address of the sender of the Email, and outputting the Email address of the intended recipient of the Email and the email address of the sender of the Email;

a user mobile phone number corresponding unit for receiving the Email address of the intended recipient of the Email output by the Email information reading unit, looking up the mobile phone number for the first user corresponding to the intended recipient of the Email in the table, and outputting the mobile phone number for the first user to the call informing device;

an outgoing call number corresponding unit for receiving the Email address of the intended recipient of the Email and the Email address of the sender of the Email output by the Email information reading unit, looking up the user account based on the Email address of the intended recipient of the Email, looking up the caller ID corresponding to the sender of the Email in the user account based on the Email address of the sender of the Email, and outputting the caller ID corresponding to the sender of the Email to the call informing device; and wherein the automatic Email receiving device comprises:

a sender corresponding unit for looking up the sender or the Email address of the sender in a caller ID table based on the caller ID of the sender, and outputting sender information on the sender;

a notifying unit for receiving the sender information output by the sender corresponding unit, notifying the user of the arrival of the Email at the Email server, and displaying the sender or the Email address of the sender on a display of a mobile phone of the first user;

a control unit for receiving a download command from the first user and outputting a control signal for downloading the Email; and an automatic downloading unit for receiving the sender information output by the sender corresponding unit and the control signal output by the control unit, and automatically accessing the Email processing device to download the Email from the server to the mobile phone.

5. A method for informing a user of the arrival of an Email at an Email server via a mobile phone, the method comprising:

associating an Email address for a first user with a mobile phone number for the first user and storing the Email address and the mobile phone number in the table; setting up a user account for the first user wherein an Email address for a second user is associated with a caller ID for the second user;

detecting if an Email arrives at an Email server;

if the Email arrives at the Email server:

using the Email address of the first user as an intended recipient of the Email to look up the mobile phone number for the first user in the table;

using the Email address of the second user as a sender of the Email to look up the caller ID for the second user in the user account;

dialing the mobile phone number for the first user to inform the first user of the arrival of the Email and to send the caller ID corresponding to the sender to mobile phone of the first user, and hanging up automatically within a preset time.

6. The method according to claim 5, wherein if the Email address of the sender does not correspond to a caller ID in the user account, dialing the mobile phone number for the first user with a preset caller ID.

7. A method for receiving an Email via a mobile phone, the method comprising:

associating an Email address for a first user with a mobile phone number for the first user and storing the Email address and the mobile phone number in the table;

setting up a user account for the first user wherein an Email address of a second user is associated with a caller ID for the second user;

detecting if an Email arrives at an Email server;

if the Email arrives at the Email server:

using the Email address of the first user as an intended recipient of the Email to look up the mobile phone number for the first user in the table;

using the Email address of the second user as a sender of the Email to look up the caller ID for the second user in the user account;

dialing the mobile phone number for the first user with the caller ID corresponding to the second user;

judging if an incoming call to a mobile phone of the first user is coming from an Email processing device and, if so, looking up the sender or the Email address for the sender corresponding to the caller ID of the incoming call;

displaying the sender or the Email address of the sender on a display of the mobile phone of the first user;

prompting the first user prior to downloading the Email from the Email server to the mobile phone; and downloading the Email to the mobile phone if the first user presses a preset key on the mobile phone.

* * * * *